(12) United States Patent
Hu

(10) Patent No.: US 11,433,605 B2
(45) Date of Patent: Sep. 6, 2022

(54) FILAMENT MATERIALS COMPRISING MARKING ADDITIVES FOR EXTRUSION-BASED ADDITIVE MANUFACTURING SYSTEMS

(71) Applicant: Xerox Corporation, Norwalk, CT (US)

(72) Inventor: Nan Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 91 days.

(21) Appl. No.: 16/722,907

(22) Filed: Dec. 20, 2019

(65) Prior Publication Data

US 2021/0187841 A1     Jun. 24, 2021

(51) Int. Cl.
| | | |
|---|---|---|
| *B29C 64/188* | (2017.01) | |
| *B33Y 10/00* | (2015.01) | |
| *B29C 64/118* | (2017.01) | |
| *B33Y 70/10* | (2020.01) | |
| *C08K 3/013* | (2018.01) | |
| *C08L 5/00* | (2006.01) | |
| *C08L 61/28* | (2006.01) | |
| *C08K 3/04* | (2006.01) | |
| *C08L 55/02* | (2006.01) | |
| *B41M 5/26* | (2006.01) | |

(52) U.S. Cl.
CPC .......... *B29C 64/188* (2017.08); *B29C 64/118* (2017.08); *B33Y 10/00* (2014.12); *B33Y 70/10* (2020.01); *C08K 3/013* (2018.01); *C08K 3/042* (2017.05); *C08L 5/00* (2013.01); *C08L 55/02* (2013.01); *C08L 61/28* (2013.01); *B41M 5/267* (2013.01); *C08K 2201/011* (2013.01)

(58) Field of Classification Search
CPC .. C08K 3/013; C08K 3/042; C08K 2201/011; C08L 5/00; C08L 55/02; C08L 61/28
See application file for complete search history.

(56) References Cited

U.S. PATENT DOCUMENTS

| | | | |
|---|---|---|---|
| 6,482,511 B1 | 11/2002 | Martinez Antonio | |
| 9,626,608 B2 | 4/2017 | Bobbitt, III | |
| 2013/0188003 A1 | 7/2013 | Thaker | |
| 2018/0273730 A1 | 9/2018 | Rueger et al. | |
| 2020/0102453 A1* | 4/2020 | Waicukauski | ........ B29C 64/118 |

FOREIGN PATENT DOCUMENTS

| | | |
|---|---|---|
| EP | 0708147 A1 | 4/1996 |
| EP | 3265293 A1 | 1/2018 |
| WO | 2016142147 A1 | 9/2016 |
| WO | 2018052899 A1 | 3/2018 |

OTHER PUBLICATIONS

Office Action issued for CA Application No. 3,102,016, dated Nov. 4, 2021, 5 pages.
Extended EP Search Report for Application No. 20211722.2, dated Apr. 26, 2021, 10 pages.

* cited by examiner

*Primary Examiner* — Edward J Cain

(57) ABSTRACT

A filament material and a method for producing the same is disclosed. For example, the filament material includes a polymer resin that is compatible with an extrusion based printing process and a marking additive that allows selective portions of the filament material to change color when exposed to a light, wherein the marking additive is added to approximately 0.01 to 25.00 weight percent (wt %).

9 Claims, 5 Drawing Sheets

FILAMENT MATERIALS COMPRISING MARKING ADDITIVES FOR EXTRUSION-BASED ADDITIVE MANUFACTURING SYSTEMS

The present disclosure relates generally to filament materials and, more particularly, to filament materials that include marking additives for extrusion-based additive manufacturing systems.

BACKGROUND

Three-dimensional (3D) printing is a technology that allows 3D objects to be printed with controlled internal and external geometry layer-by-layer using a computer-aided design (CAD) file. For example, a starting material may be used and selectively melted and bonded to form a 3D object. Different types of 3D printers are available today. The different types of 3D printers may perform different types of additive printing. Examples of 3D printing technology may include extrusion-based printing, such as fused filament fabrication (FFF), also known as fused deposition modeling (FDM), selective laser sintering (SLS), selective laser melting (SLM), electronic beam melting (EBM), digital light processing (DLP), stereolithography (SLA), laminated object manufacturing (LOM), binder jetting, and the like.

SUMMARY

According to aspects illustrated herein, there is provided a filament material for use in an extrusion based printer. One disclosed feature of the embodiments is a filament material, comprising a polymer resin that is compatible with an extrusion based printing process and a marking additive that allows selective portions of the filament material to change color when exposed to a light, wherein the marking additive is added to approximately 0.01 to 25.00 weight percent (wt %).

Another disclose feature of the embodiments is a method to produce a filament material with a marking additive for a fused deposition modeling (FDM) printer. The method comprises providing a polymer resin that is compatible with the FDM printer, mixing into the polymer resin the marking additive in amount of approximately 0.01 to 25.00 weight percent (wt %) to form the filament material with the marking additive, and exposing select portions of the filament material to a light to form a mark on a surface of the filament material, wherein the marking additive mixed into the polymer resin at the select portions absorbs the light to change color and form the mark.

Another disclosed feature of the embodiments is a method marking a three-dimensional (3D) printed object that is printed with a filament material with the marking additive. The method comprises receiving, by a processor, instructions to print the 3D printed object, controlling, by the processor, an extrusion based printer to print the 3D printed object in accordance with the instructions, wherein the 3D printed object is printed with the filament material with the marking additive, wherein the filament material with the marking additive comprises a polymer resin and 0.01 to 25.00 weight percent (wt) of the marking additive, receiving, by the processor, marking instructions associated with a marking for the 3D printed object, and controlling, by the processor, a laser to expose portions a surface of 3D printed object in accordance with the marking instructions to change a color of the portions of the surface of 3D printed object to write the marking on the surface of the 3D printed object.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure is related to a filament material with marking additives and a method for making the same. In addition, the filament material with marking additives can be used to print 3D objects and mark the 3D objects by changing the color of selected portions of the surface of the 3D object. As discussed above, various 3D printing technologies are used today. However, after the 3D object is printed, marking materials can be added to provide identification of the object, labeling information, security information, and the like.

Currently available ways of marking a 3D printed object have many drawbacks. For example, a separately printed label can be applied to the object. However, the label can be easily removed or damaged. Another example may be to physically print the label into the object as part of the printing process. In other words, the desired marks can be physically printed (e.g., the desired letters are raised portions on the surface of the 3D object) into the 3D printed object. Another example may be to etch away or melt away portions of the 3D printed object using, for example, laser engraving. However, since most 3D printed objects have a rough surface texture, these solutions may not be suitable to achieve high contrast markings for many areas of application. Further, these solutions may suffer from additional complexity, limitations on how small markings can be printed due to the physical properties of the material, and so forth.

The present disclosure provides a filament material with marking additives that can be used in extrusion-based 3D printers, such as FFF or FDM 3D printers. The marking additives can absorb light to change the optical properties of the filament material. For example, certain marking additives can result in optical or color change of the filament material when exposed to infrared light.

Thus, markings can be written directly into the surface of the filament or the 3D printed object by exposing desired locations on the surface to a light source. The portions that are exposed to the light source may change color, and the marking may be written on the surface of the filament or the 3D printed object. The markings may be written to any desired size. In addition, the markings may be added relatively quickly, as the marking additive may change color when exposed to light at speeds up to 8 meters per second. Thus, the markings created by the filament material with the marking additives may be more permanent and secure than currently available marking methods.

Figure 1:
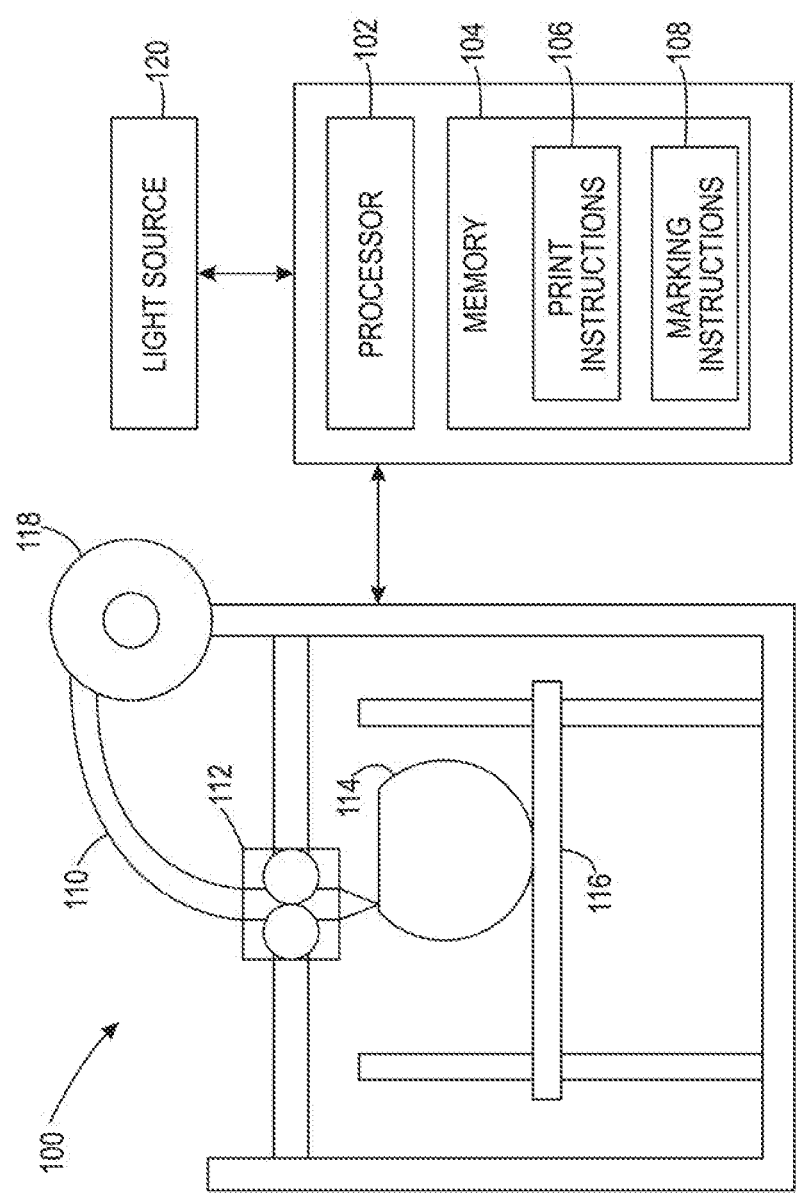
FIG. 1 illustrates an example of a fused deposition modeling (FDM) printer that uses the filament materials with the marking additives of the present disclosure.

FIG. 1 illustrates an example of a fused deposition modeling (FDM) printer 100 that uses filament materials with marking additives 110 (also herein referred to as a filament material 110) of the present disclosure. Although FIG. 1 illustrates a particular type of extrusion based printer as an example, it should be noted that the filament material 110 can be used with any type of extrusion based printer or printing process. In one embodiment, the FDM printer 100 may have a continuous roll of the filament materials 110 that is fed through a printhead 112. The printhead 112 may have a heater that melts the filament materials 110 and extrudes the filament materials 110.

The filament materials 110 may be extruded layer by layer to form a 3D printed object 114. For example, the filament materials 110 may be printed on a movable platform 116. After each layer of the 3D printed object 114 is printed, the platform 116 may be lowered, and the next layer of the 3D printed object 114 may be printed until the 3D printed object 114 is completely printed. In one embodiment, the printhead 112 may be movable on a two-dimensional coordinate system (e.g., left and right along the page and into and out of the page).

In one embodiment, the FDM printer 100 may be controlled by a processor 102 that is communicatively coupled to the printhead 112 and a roller 118 of the filament materials 110. The FDM printer 100 may also include a memory 104 that is communicatively coupled to the processor 102. The memory 104 may be any type of non-transitory computer readable medium. For example, the memory 104 may be a hard disk drive, a solid state drive, a random access memory, a read-only memory, and the like.

In one embodiment, the memory 104 may include instructions that are executed by the processor 102. For example, the memory 104 may include print instructions 106 and marking instructions 108. In one embodiment, the processor 102 may control the feed of the filament material 110 and control dispensing of the filament material 110 via movement of the printhead 112 in accordance with the print instructions 106 to print the 3D object 114.

In one embodiment, the processor 102 may also control a light source 120 to mark the 3D printed object 114 or the filament material 110 itself. Although the lights source 120 is illustrated as being part of the FDM printer 100 in FIG. 1, it should be noted that the light source 120 may be a separate device or component that is independently controlled by another controller or processor. In other words, the 3D printed object 114 or the filament material 110 may be completed and then transferred to an apparatus with the light source to receive the light for marking.

In one embodiment, the processor 102 may mark the 3D printed object 114 or the filament material 110 in accordance with the marking instructions 108. The light source 120 may be a laser that may be operated at a wavelength in an infrared region ranging from approximately 700 nanometers (nm) to 10.6 microns (µm). Examples of lasers may include solid-state lasers, diode or diode array lasers, yttrium aluminum garnet (YAG) lasers, fiber lasers, carbon dioxide ($CO_2$) lasers, and the like. The light source 120 may be operated in a pulsed mode or a continuous mode.

As noted above, the filament material 110 may include a marking additive. When the filament material with marking additives 110 is exposed to a certain wavelength of light from the light source 120, the surface of the filament material 110 or the 3D printed object 114 that is exposed to the light may change color. Thus, the marking can be directly "written" on the filament material 110 or the 3D printed object 114 by the light source 120. Notably, the marking is not being etched or physically formed by additional printing of the filament material 110. Rather, the physical properties of the filament material with marking additives 110 are being changed to create the markings. As a result, the markings may be more secure and permanent than can be produced using current methods to add markings to 3D printed objects.

In one embodiment, the filament material 110 may be formulated or created by mixing a polymer resin with a marking additive. The polymer resin may be any type of polymer resin that is compatible with the FDM printer 100. For example, the polymer resin may have a melting temperature or a softening temperature and a viscosity that allows the FDM printer 100 to control how the polymer resin is dispensed. The polymer resin may be a thermoplastic, including crystalline, semi-crystalline, or amorphous polymer resins. Examples of polymer resins that can be used include acrylic resins; polymers or copolymers produced from the monomers selecting from the group consisting of acrylonitrile, butadiene, styrene, an acrylate, a methacrylate, and the mixture thereof; polyolefins; polyesters; polycarbonates; polylactic acid; thermoplastic polyurethanes; polyamides; polyimides; polysulfone; poly(aryl ethers); poly(aryl ether ketones); poly(aryl ether sulfones); poly(ether imide); polyarylenesulfides, poly(vinyl alcohol), polyvinylidene fluoride, or any combinations thereof. Specific examples of the polymer resins are polymethyl methacrylate (PMMA), acrylonitrile butadiene styrene (ABS) resin, Nylon-6, nylon-12, polyethylene terephthalate (PET), polybutylene terephthalate (PBT), polyethylene, polypropylene, polypropylene, polyaryletherketones (PAEK), polylactic acid (PLA), thermoplastic polyurethanes (TPU), and the like, or any combinations thereof.

In one embodiment, the marking additives used in the filament material 110 of the present disclosure should possess good light fastness and weatherability. In addition, the marking additives should be compatible with the manufacturing processes of the filament material 110 and the 3D printing processes described herein. For example, the marking additives may have good thermal stability at a temperature that is at least that of a melting point or softening temperature of the filament material 110. Furthermore, the marking additive may be compatible with the polymer resins used for the filament material 110, be environmentally friendly, readily available, and non-toxic.

In one embodiment, the marking additive may be a light absorbing marking additive. In one embodiment, the marking additive may be an infrared light absorbing marking additive. The marking additive may possess efficient absorption of the light radiation within a wavelength region of the FDM printer 100. The marking additive may possess efficient absorption of the light radiation within a wavelength region of the FDM printer 100. The marking additive may be added or mixed with the polymer resin at approximately 0.01 weight percent (wt %) to 25.00 wt %. In one embodiment, the marking additive may be added at approximately 0.10 wt % to 10.00 wt %. In one embodiment, the marking additive may be added at approximately 0.50 wt % to 5.00 wt %. The weight percentage may be a ratio of the marking additive to a total weight of the filament material.

In one embodiment, the amounts of the marking additives described herein may allow the polymer resin to maintain good printability in the FDM printer 100. In addition, the amounts of the marking additives may allow the polymer resins to maintain the same mechanical strengths of the 3D printed object 114 as compared to the polymer resins without the marking additives.

In one embodiment, the marking additive may be an additive that changes color or reacts when exposed to a light emitted by the light source 120. In one embodiment, the marking additive may include an infrared absorption component that absorbs wavelengths of approximately 700 nanometers (nm) to 11,000 nm. In one embodiment, the marking additive may absorb wavelengths of approximately 780 nm to about 2500 nm. For example, the light may be emitted by a semi-conducting laser beam that is continuously emitted or pulsed, as described above. In one embodiment, examples of the infrared absorption component may include a metal oxide, a non-stoichiometric metal oxide, a metal hydroxide, a copper hydroxyphosphate, a copper pyrophosphate; a base copper carbonate, ammonium octamolebdate, a silver halide, a phthalocyanine, a naphthalocyanine, graphitic oxide, graphene oxide, carbon black, or a mixture thereof.

Examples of metals for the metal oxide or the non-stoichiometric metal oxide may include tin, antimony, bismuth, boron, titanium, indium, iron, copper, molybdenum, tungsten, vanadium, or any combination thereof. Examples of the metal oxide or non-stoichiometric metal oxide may include titanium oxide, boron anhydride, tin oxide, bismuth oxide, copper oxide, iron oxide, molybdenum oxide, vanadium oxide, antimony-doped tin oxide, antimony-doped indium tin oxide, reduced indium tin oxide, oxygen-deficient bismuth oxide, metal hydroxides, or any combination thereof. Examples of the metal hydroxide may include aluminum hydroxide, magnesium hydroxide, copper hydroxide, and a mixture thereof. Examples of the phthalocyanines include metal-free phthaocyanines and metal phthalocyanines such as copper phthocyanines. Similarly, the example of the naphthalocyanines may include metal-free or metal naphthalocyanines.

In one embodiment, the filament material 110 may include a marking additive that absorbs light at wavelengths of approximately 780 nm to 2500 nm emitted by a near infrared laser. For example, the near infrared laser may be a YAG laser which operates at a wavelength of approximately 1064 nm. In one embodiment, the filament material 110 may include a marking additive that absorbs light at wavelengths above 2500 nm using a $CO_2$ laser operating at approximately 10.6 μm.

In one embodiment, the marking additive used for the filament material 110 disclosed herein may further comprise a developer component. The developer component itself may not be sensitive to the radiation emitted by the light source 120. However, when used in combination with marking additives described above (e.g., the metal oxides, metal salts, and/or the metal compounds, carbon black, graphene oxide, or any combination thereof), the developer component may be reactive to assist color change of the filament material 110. Suitable developer components may include a polyphenol, a melamine resin, a polysaccharide, or any combination thereof.

In one embodiment, the marking additive may be provided in a particulate form. The marking additive may be particles having an average diameter of approximately 10 nm to 5000 nm. In one embodiment, the particles may have an average diameter of approximately 10 nm to 1000 nm.

In one embodiment, the marking additive may also include an inert support material. Examples of the inert support material may include silica, alumina, titanium oxide, zinc oxide, mica, calcium carbonate, kaolin, talc, ceramic, and the like.

In one embodiment, the filament material 110 may also include a pigment or a colorant. The pigment or colorant may be inert to the radiation received during the marking process. However, the pigment or colorant may provide a background to enhance the marking contrast or visibility. Examples of the pigment or colorant that can be used include titanium oxide, zinc oxide, iron oxide, carbon black, organic pigments, and the like.

In one embodiment, after the polymer resin and the marking additive are mixed together to form a mixture, the mixture may be formed into a ribbon or cord of the filament material with marking additives 110. The continuous cord of the filament material with marking additives 110 may be stored on the roller 118 to be fed through the printhead 112 for extrusion, as discussed above.

Examples are provided below of the filament materials 110 that can be produced.

Example 1

A Filabot EX6 extruder (purchased from Filbot Company) is used for the preparation of filament materials with laser marking additive composition. 100 parts of ABS (acrylonitrile butadiene styrene) resin pellets are blended with 3 parts of graphene oxide, and fed into the Filabot EX6 extruder. Under the vendor recommended extrusion settings, the resin blends were extruded into 2.85-mm filaments with light brownish color.

The resultant filaments can be used for 3D printing using an FDM printer. The printed parts may be marked using a marking equipment with a $CO_2$ laser operating at 10.6 μm to print dark marks on the exposed surface.

Example 2

A filament material is made in a similar manner according to Example 1, except that polybutylene terephthalate (PBT) is selected as the polymer resin and copper hydroxyphosphase as the marking additive composition.

The resultant filaments can be used for 3D printing using an FDM printer. The printed parts may be marked using a marking equipment with a YAG laser operating at 1064 nm to print dark marks on the exposed surface.

Example 3

A filament material is made in a similar manner according to Example 1, except that a mixture of copper hydroxyphosphase and ammonium octamolybdate is used as the marking additive composition.

The resultant filaments can be used for 3D printing using an FDM printer. The printed parts may be marked using a marking equipment with a YAG laser operating at 1064 nm or a CO2 laser to print dark marks on the exposed surface.

Figure 2:
FIG. 2 illustrates an example of the filament materials with the marking additives of the present disclosure that are marked.

FIG. 2 illustrates an example of the filament materials with marking additives 110 that has been marked. For example, the light source 120 may be used to expose portions of the surface of the filament materials 110 with a marking 202. The marking 202 may be created by changing the color of selected portions of the surface of the filament material 110 with the light source 120.

In one embodiment, the markings 202 may be alphanumeric text. In one embodiment, the markings 202 may be a symbol or graphic. For example, the markings 202 may be a barcode or quick response (QR) code that can be read by a scanner. The markings 202 on the filament materials 110 may indicate processing parameters for the filament materials 110 when used in the FDM printer 100. For example, the markings 202 may be read or scanned to automatically configure the heaters to an appropriate temperature to melt the filament materials 110 for extrusion, and so forth.

Figure 3:
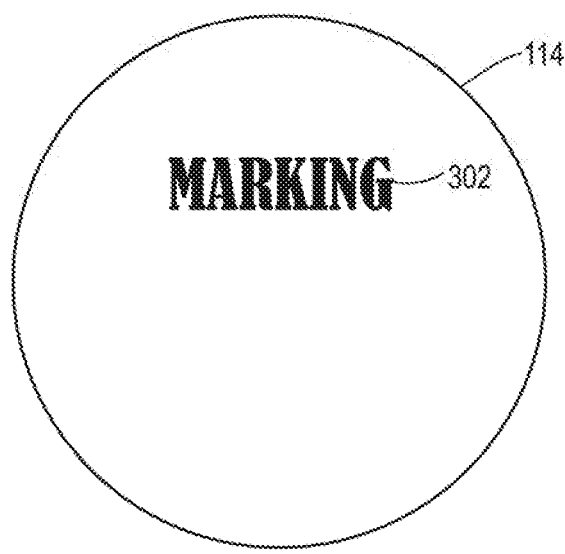
FIG. 3 illustrates an object that is printed with the filament materials with the marking additives of the present disclosure that is marked.

FIG. 3 illustrates an example of the 3D printed object 114 that is marked. For example, the light source 120 may be used to expose portions of the surface of the 3D printed object 114 with a marking 302. The marking 302 may be created by changing the color of selected portions of the surface of the 3D printed object with the light source 120.

In one embodiment, the marking 302 may be alphanumeric text. In one embodiment, the marking 302 may be a symbol or graphic. For example, the marking 302 may be a barcode or quick response (QR) code that can be read by a scanner. The marking 302 on the 3D printed object 114 may provide identification information, security information, product information, and the like, associated with the 3D printed object 114.

Figure 4:
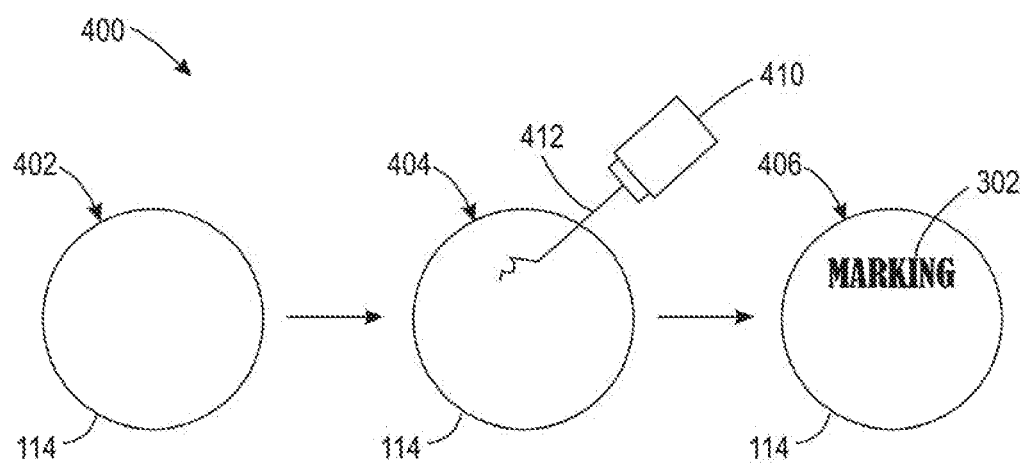
FIG. 4 illustrates an example process flow diagram of marking the filament material with the marking additives of the present disclosure.

FIG. 4 illustrates an example process flow diagram 400 of marking the 3D printed object 114 that is printed with the filament materials with marking additives 110 of the present disclosure. It should be noted that the process flow diagram 400 may also be applied to marking the filament material 110 itself.

At block 402, the completed 3D printed object 114 may be provided. At block 404, a light source 410 may emit light 412 onto the surface of the 3D printed object 114. The light source 410 and the light source 120 may be the same. For example, the light source 410 may be a laser light source that provides pulsed laser light or continuous laser light. The light 412 may be emitted at wavelengths that cause the exposed portions of the filament materials with marking additives 110 to react and change color. In one embodiment, the light 412 may be emitted at wavelengths of approximately 1060 nm to 1070 nm.

At block 406, the light source 410 may be moved until the marking 302 is completed. For example, the light source 410 may be moved in accordance with the marking instructions 108 or the 3D printed object 114 may be moved below the light source 410 in accordance with the marking instructions 108.

In one embodiment, the filament material with marking additives 110 may be marked efficiently with the light source 410. For example, the marking 302 may be written at speeds of up to 8 meters per second (8 m/s). Thus, light source 410 may be able to "write" over 1,000 alphanumeric characters per second. Thus, the filament material with marking additives 110 allows the 3D printed object 114 and/or the filament material itself to be marked efficiently or more quickly than other currently used marking methods (e.g., etching, additional 3D printing, and the like).

In addition, the filament material with marking additives 110 allows finer precision when writing the marking 302. This may allow the marking 302 to be written in much smaller sized fonts than are possible using current methods. For example, when etching, the materials may melt and the characters may be difficult to read when written too small. Alternatively, the printer may not be able to print markings that are too small (e.g., the marking may be smaller than a voxel printing size of the printer). Thus, the filament material with marking additives 110 provides more flexibility in the size and location of where the marking 302 can be printed.

Figure 5:
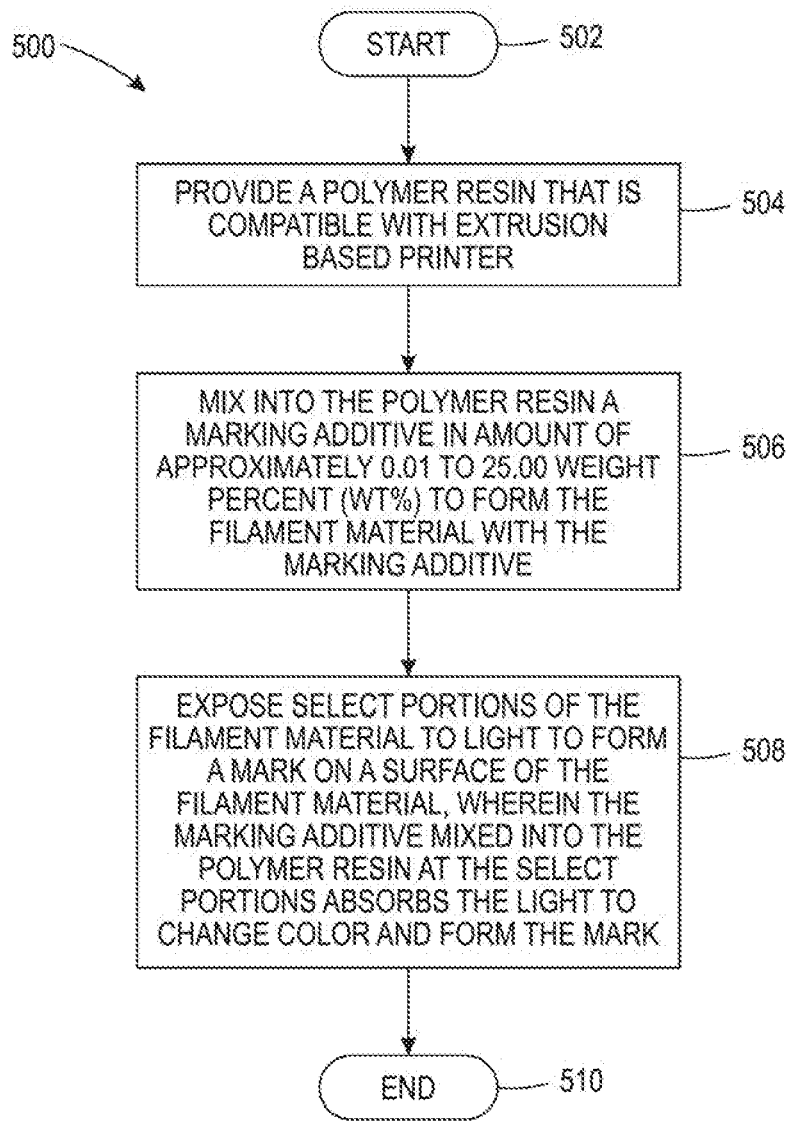
FIG. 5 illustrates a flow chart of an example method for producing a filament material with a marking additive for a FDM printer.

FIG. 5 illustrates a flow chart of an example method 500 for producing a filament material with a marking additive for an extrusion based printer (e.g., the FDM printer 100 illustrated in FIG. 1) of the present disclosure. The method 500 may be performed by tools under the control of a processor.

At block 502, the method 500 begins. At block 504, the method 500 provides a polymer resin that is compatible with the extrusion based printer. The polymer resin may be any type of polymer resin that is compatible with the extrusion based printer. For example, the polymer resin may have a melting temperature and a viscosity that allows the extrusion based printer to control how the polymer resin is dispensed. Examples of polymer resins that can be used include acrylic resins; polymers or copolymers produced from the monomers selecting from the group consisting of acrylonitrile, butadiene, styrene, an acrylate, a methacrylate, and a mixture thereof; polyolefins; polyesters; polycarbonates; polylactic acid; thermoplastic polyurethanes; polyamides; polyimides; polysulfone; poly(aryl ethers); poly(aryl ether ketones); poly(aryl ether sulfones); poly(ether imide); polyarylenesulfides, poly(vinyl alcohol), polyvinylidene fluoride, or any combinations thereof. Specific examples of the polymer resins are polymethyl methacrylate (PMMA), acrylonitrile butadiene styrene (ABS) resin, Nylon-6, nylon-12, polyethylene terephthalate (PET), polybutylene terephthalate (PBT), polyethylene, polypropylene, polypropylene, polyaryletherketones (PAEK), polylactic acid (PLA), thermoplastic polyurethanes (TPU), and the like, or any combinations thereof.

At block 506, the method 500 mixes into the polymer resin the marking additive in an amount of approximately 0.01 to 25.00 weight percent (wt %) to form the filament material with the marking additive. In one embodiment, the marking additive may be a light absorbing marking additive. In one embodiment, the marking additive may be an infrared light absorbing marking additive.

In one embodiment, the amounts of the marking additives described herein may allow the polymer resin to maintain good printability in the FDM printer. In addition, the amounts of the marking additives may allow the polymer resins to maintain the same mechanical strengths of the 3D printed object as compared to the polymer resins without the marking additives.

In one embodiment, the marking additive may be an additive that changes color or reacts with light emitted at wavelengths of approximately 780 nanometers (nm) to 11,000 nm. For example, the light may be emitted by a semiconducting laser beam that is continuously emitted or pulsed. Examples of suitable marking additives may include a metal oxide, a non-stoichiometric metal oxide, a metal hydroxide, a copper hydroxyphosphate, a copper pyrophosphate; a base copper carbonate, ammonium octamolebdate, a silver halide, a phthalocyanine, a naphthalocyanine, graphitic oxide, graphene oxide, carbon black, or a mixture thereof.

In one embodiment, after the polymer resin and the marking additive are mixed together to form a mixture, the mixture may be formed into a ribbon or cord of the filament material with marking additives. The continuous cord of the filament material with marking additives may be stored on the roller to be fed through the printhead for extrusion, as discussed above.

At block 508, the method 500 exposes select portions of the filament material to light to form a mark on a surface of the filament material, wherein the marking additive mixed into the polymer resin at the select portions absorbs the light to change color and form the mark. For example, a laser light source that provides pulsed laser light or continuous laser light may be applied to the select portions of the filament material. The light may be emitted at wavelengths of approximately 780 nm to 11,000 nm. The light source may be moved, the filament material may be moved, or both the light source and the filament material may be moved to "write" the mark onto the surface of the filament material. The mark may be formed by a reaction of the marking additive in the filament material to the light. The reaction may cause the marking additive to change color in the filament material. At block 510, the method 500 ends.

Figure 6:
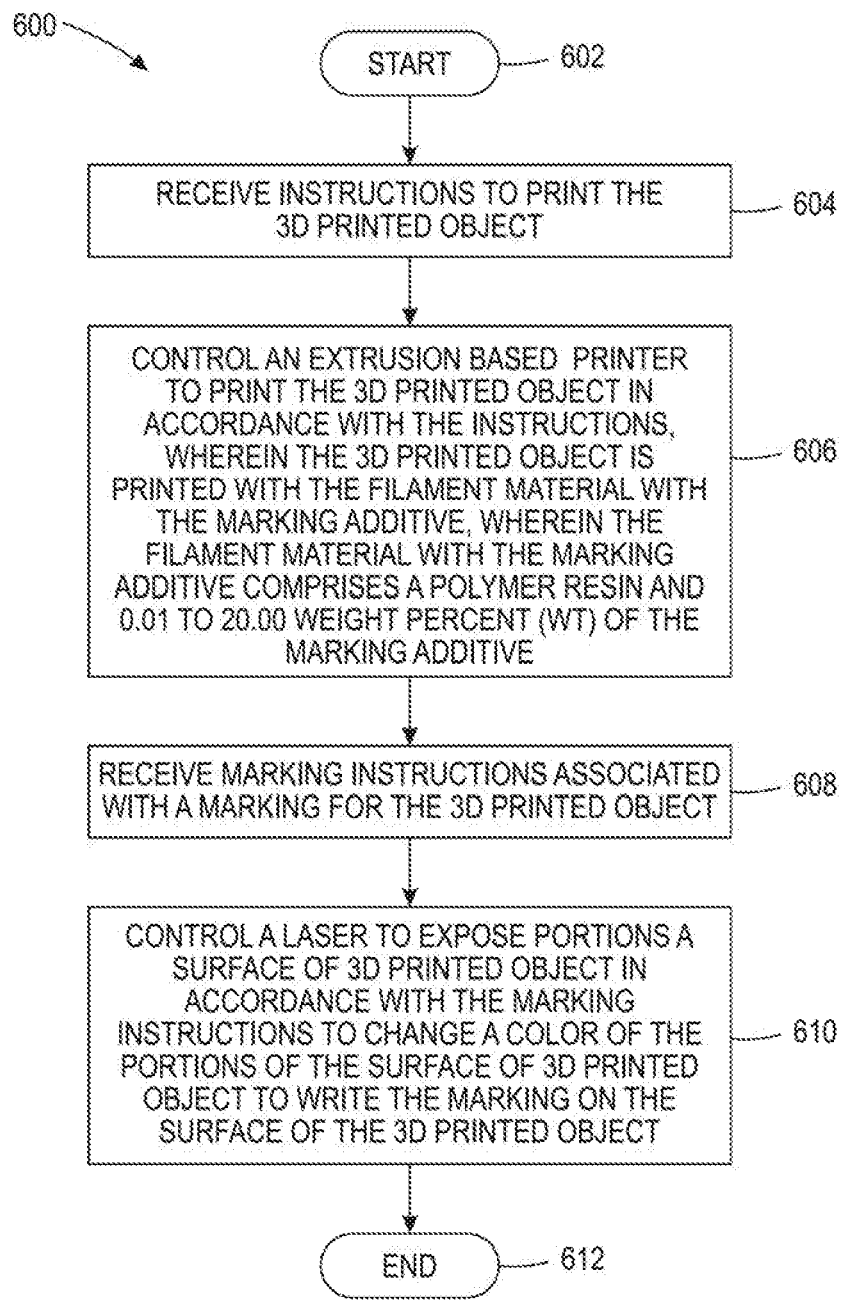
FIG. 6 illustrates a flow chart of an example method for marking a 3D printed object that is printed with the filament material with the marking additives.

FIG. 6 illustrates a flow chart of an example method 600 for marking a 3D printed object that is printed with the filament material with the marking additives. The method 600 may be performed by the FDM printer 100 or the processor 102 described above.

At block 602, the method 600 begins. At block 604, the method 600 receives instructions to print the 3D printed object. For example, the design of the 3D printed object may be created on a computing device (e.g., a computer aided drawing (CAD) program executed on the computing device). The design may include parameters for how much filament material is to be dispensed on each layer along an X-Y coordinate system. The design may be stored as print instructions that are provided to the FDM printer and stored in memory in the FDM printer.

At block 606, the method 600 controls an extrusion based printer to print the 3D printed object in accordance with the instructions, wherein the 3D printed object is printed with the filament material with the marking additive, wherein the filament material with the marking additive comprises a polymer resin and 0.01 to 25.00 weight percent (wt) of the marking additive. The filament material may include a polymer resin mixed with the marking additive. The polymer resin may be any type of polymer resin that is compatible with the extrusion based printer. For example, the polymer resin may have a melting temperature and a viscosity that allows the extrusion based printer to control how the polymer resin is dispensed. Examples of polymer resins that can be used include acrylic resins; polymers or copolymers produced from the monomers selecting from the group consisting of acrylonitrile, butadiene, styrene, an acrylate, a methacrylate, and a mixture thereof; polyolefins; polyesters; polycarbonates; polylactic acid; thermoplastic polyurethanes; polyamides; polyimides; polysulfone; poly (aryl ethers); poly(aryl ether ketones); poly(aryl ether sulfones); poly(ether imide); polyarylenesulfides, poly(vinyl alcohol), polyvinylidene fluoride, or any combinations thereof. Specific examples of the polymer resins are polymethyl methacrylate (PMMA), acrylonitrile butadiene styrene (ABS) resin, Nylon-6, nylon-12, polyethylene terephthalate (PET), polybutylene terephthalate (PBT), polyethylene, polypropylene, polypropylene, polyaryletherketones (PAEK), polylactic acid (PLA), thermoplastic polyurethanes (TPU), and the like or any combinations thereof.

In one embodiment, the marking additive may be a light absorbing marking additive. In one embodiment, the marking additive may be an infrared light absorbing marking additive.

In one embodiment, the amounts of the marking additives described herein may allow the polymer resin to maintain good printability in the extrusion based printer. In addition, the amounts of the marking additives may allow the polymer resins to maintain the same mechanical strengths of the 3D printed object as compared to the polymer resins without the marking additives.

In one embodiment, the marking additive may be an additive that changes color or reacts with light emitted at wavelengths of approximately 780 nanometers (nm) to 11,000 nm. For example, the light may be emitted by a semiconducting laser beam that is continuously emitted or pulsed. Examples of suitable marking additives may include a metal oxide, a non-stoichiometric metal oxide, a metal hydroxide, a copper hydroxyphosphate, a copper pyrophosphate; a base copper carbonate, ammonium octamolebdate, a silver halide, a phthalocyanine, a naphthalocyanine, graphitic oxide, graphene oxide, carbon black, or a mixture thereof.

The filament material may be melted by the extrusion based printer and extruded through a printhead. The filament material may be dispensed in accordance with the print instructions layer by layer to print the 3D printed object.

At block 608, the method 600 receives marking instructions associated with a marking for the 3D printed object. In one embodiment, the marking instructions may be provided through a user interface of the extrusion based printer. In one embodiment, the marking instructions may be created on a separate computing device and transmitted to the extrusion based printer and stored in memory.

The marking for the 3D printed object may be alphanumeric text, a graphic, an image, or any combination thereof. The marking may include process parameters for the extrusion based printer (e.g., when on the filament material itself), identification information, security information, product information, and the like. The marking may be a bar code or a QR code that can be scanned by a reader. The marking may be a company logo, and so forth.

At block 610, the method 600 controls a laser to expose portions a surface of 3D printed object in accordance with the marking instructions to change a color of the portions of the surface of 3D printed object to write the marking on the surface of the 3D printed object. In one embodiment, the extrusion based printer may include the laser to create the marking in accordance with the marking instructions. In one embodiment, the processor that controls the extrusion based printer may be communicatively coupled to the laser. In one embodiment, the 3D printed object may be moved from the extrusion based printer to a marking apparatus that includes the laser.

In one embodiment, a laser may provide pulsed laser light or continuous laser light that may be applied to the select portions of the filament material. The light may be emitted at wavelengths of approximately 780 nm to 11,000 nm. The laser may be moved, the 3D printed object may be moved, or both the laser and the 3D printed object may be moved to "write" the marking onto the surface of the 3D printed object. The marking may be formed by a reaction of the marking additive in the filament material to the light emitted by the laser. The reaction may cause the marking additive to change color in the filament material. At block 612, the method 600 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A filament material, comprising:
a polymer resin that is compatible with an extrusion based printing process;
a marking additive that allows selective portions of the filament material to change color when exposed to a light, wherein the marking additive is added to approximately 0.01 to 25.00 weight percent (wt %); and
a developer component comprising at least one of: a polyphenol, a melamine resin, or a polysaccharide.

2. The filament material of claim 1, wherein the polymer resin comprises polymers or copolymers produced from acrylonitrile.

3. The filament material of claim 1, wherein the marking additive comprises an infrared absorption component that absorbs the light at wavelengths of approximately 780 nanometers (nm) to 11000 nm.

4. The filament material of claim 1, wherein the marking additive comprises graphene oxide.

5. The filament material of claim 1, further comprising:
a support material comprising at least one of: silica, alumina, titanium oxide, mica, kaolin, zinc oxide, calcium carbonate, talc, or ceramic.

6. The filament material of claim 1, further comprising:
a pigment or a colorant.

7. The filament material of claim 1, wherein the filament material is formed into a filament for a fused deposition modeling printer.

8. A filament material, comprising:
a polymer resin that is compatible with an extrusion based printing process;
a marking additive that allows selective portions of the filament material to change color when exposed to a light, wherein the marking additive is added to approximately 0.01 to 25.00 weight percent (wt %); and
a support material comprising at least one of: silica, alumina, titanium oxide, mica, kaolin, zinc oxide, calcium carbonate, talc, or ceramic.

9. A filament material, comprising:
a polymer resin that is compatible with an extrusion based printing process;
a marking additive that allows selective portions of the filament material to change color when exposed to a light, wherein the marking additive is added to approximately 0.01 to 25.00 weight percent (wt %); and
a pigment or a colorant.

* * * * *